Patented Dec. 22, 1953

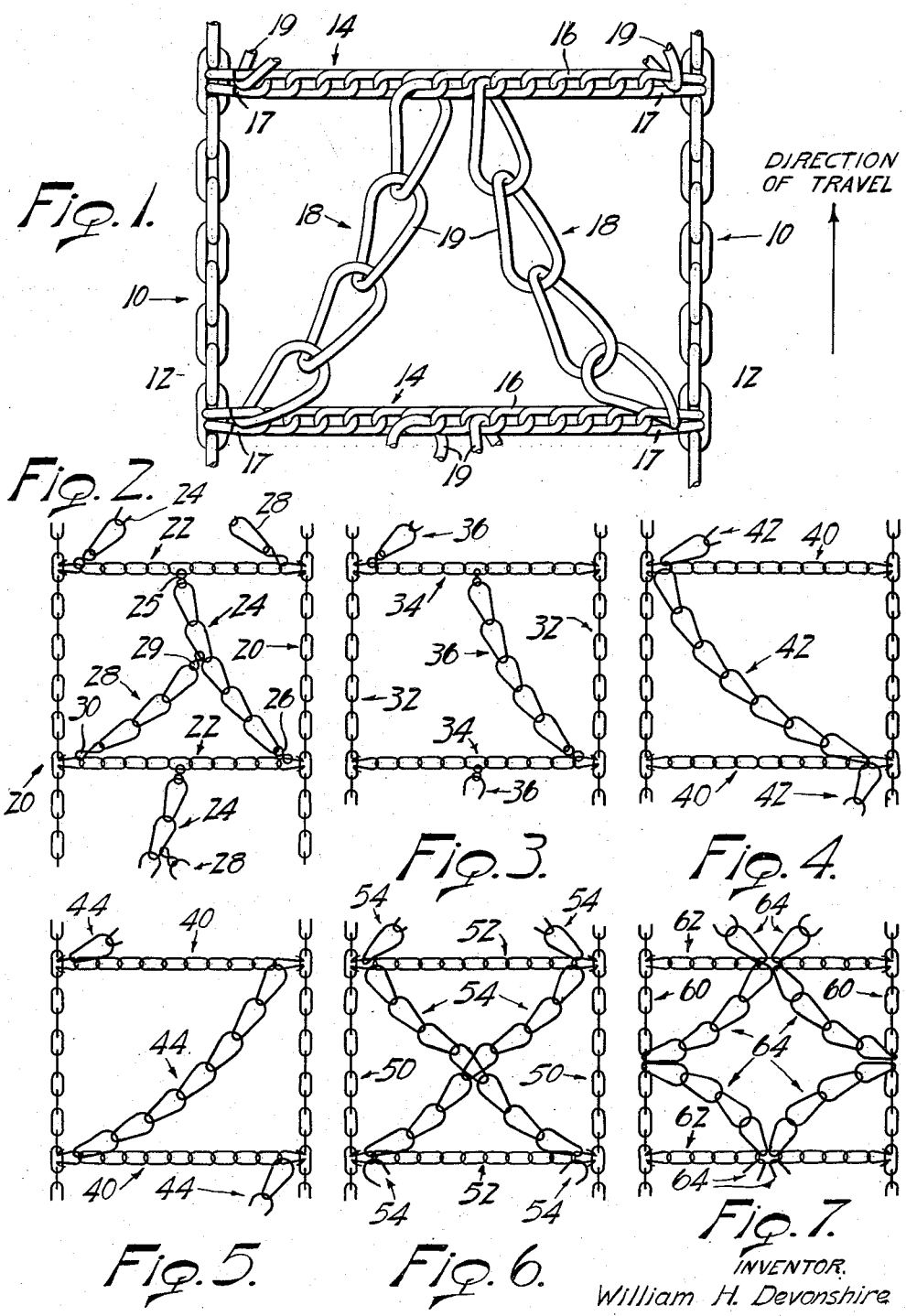

2,663,346

UNITED STATES PATENT OFFICE 2,663,346

TRACTION CHAIN

William H. Devonshire, Williamsville, N. Y., assignor to Columbus McKinnon Chain Corporation, Tonawanda, N. Y.

Application October 26, 1949, Serial No. 123,773

1 Claim. (Cl. 152—239)

This invention relates to traction chains, and more particularly to traction chains for rubber tired vehicles such as farm tractors and the like which employ tires having heavy V-shaped or other diagonally disposed cleats molded into the tread surfaces thereof.

One of the objects of the invention is to provide improvements in tire chains of the type employing traction chains which extend diagonally over the tread of the tire.

Another object of the invention is to provide improvements in traction chains which are designed specifically for farm implements and other vehicles for field or mud highway use.

Another object of the invention is to provide an improved traction chain which is particularly adapted to service in muddy highways, fields, and the like; and in which the traction chain elements thereof are of improved "self-cleaning" characteristics.

Another object of the invention is to provide an improved traction chain of the character aforesaid which in addition to the advantages set forth hereinabove provides improved traction results.

Other objects and advantages of the invention will appear from the specification hereinafter.

In the drawings:

Fig. 1 is a fragmentary plan view of a traction chain of the invention, showing a novel traction chain arrangement thereof; and Figs. 2, 3, 4, 5, 6, 7 are diagrammatic fragmentary plan views of modified forms of the traction chain arrangement of the invention.

The invention contemplates a vehicle wheel chain of the type including a pair of side chains which are adapted to lie alongside opposite side walls of a vehicle tire, and which may be provided with suitable latch devices at the opposite ends thereof adapted to be manually operated for coupling the chain in operative position upon the vehicle wheel. The side chains are interconnected by cross chain elements which extend at suitable intervals around the periphery of the tire, from one side chain to the other, thus traversing the tread portion of the vehicle tire. These cross chain elements are designed to be snugly taut against the tire tread when the device is mounted upon the wheel so as to positively position the device on the tire for best results.

The traction chain elements of the device of the invention comprise separate chain elements which extend obliquely transversely of the tire tread at intervals therearound; said traction chain elements being specially designed so as to be slack relative to the tire tread when the device is mounted upon the wheel with the cross chain elements in taut condition. Thus, the traction chain elements are permitted to flap about relative to the tire tread whereas the cross chain elements are snugly drawn thereagainst and thereby prevented from rolling relative to the tire tread. This action permits the traction chain elements to slap against the tire tread when the mounting wheel is revolving; whereby dirt and mud or ice accumulations picked up within the links of the traction chain elements are being continuously dislodged and shaken loose therefrom. This prevents clogging of the traction chain elements in such manner as would otherwise substantially reduce the tractive effectiveness of the device.

More specifically, as illustrated in Fig. 1, a tire chain of the invention may comprise a pair of side chain elements 10—10 which may be fabricated of any desired type chain links 12; the side chains 10—10 being interconnected by cross chain elements 14. The cross chain elements 14 may be fabricated of any suitable style chain links 16 and fitted with hook links 17 at each end which are arranged in engagement with the side chain links at appropriate intervals therealong. As explained hereinabove, the side chain elements 10 and the cross chain elements 14 are so dimensioned that whenever a chain device of the invention is coupled upon a vehicle tire the side chain and cross chain elements are thereby drawn into snugly taut condition for proper maintenance of the chain device in operative position on the tire.

Still referring to Fig. 1, the traction chain elements thereof are indicated generally at 18—18, and are illustrated to comprise relatively large "twisted" or "curb" links 19; the traction chain elements being disposed diagonally of the direction of rotation of the mounting wheel so that the traction link elements cross the cleat portions of the tire tread with the apex of the V defined by the converging traction chains being disposed to point in the direction of vehicle motion. Also, particular attention is called to the fact that the traction chain elements 18—18 are so dimensioned that they extend between the adjacent cross chain elements in "slack" condition. Because the relatively smaller cross chain elements are in constant tension providing for proper fit of the chains to the tires, the larger traction members remain in loose condition and are therefore free to slap against the tire tread in such manner as to shake loose any accumulation to provide the improved "self-cleaning" characteristics referred to hereinabove.

Fig. 2 illustrates another form of the invention in conjunction with a tire chain device comprising the conventional side chains 20—20 and relatively small taut cross chains 22—22 which take the tension of the traction forces during operation. The traction chain elements are again illustrated to be formed of relatively large links and are loosely arranged to extend between the relatively taut cross chain elements. One of the traction chain elements 24 is fastened at one end by means of a link 25 to one of the center links of one of the cross chain elements and at its other end by means of a link device 26 to an end link of the next succeeding cross chain element. The second traction chain element 28 is fastened at one of its ends by means of a link 29 to an approximately center link of the first traction link element 24 and at its other end by means of a link 30 to the opposite end link of the last mentioned cross chain element. This pattern is repeated, but in reverse as viewed in plan, between successive pairs of cross chain elements; and it will be appreciated that in the construction of Fig. 2 the traction chain elements are adapted to cross the diagonally disposed cleat formations of tractor wheel tires to provide the combination improved traction and self-cleaning characteristics referred to hereinabove.

Fig. 3 illustrates another form of the invention which utilizes the conventional rim chains 32—32 and relatively small sized and tautly arranged cross chain elements 34—34. As mentioned hereinabove the cross chain and rim chain elements cooperate to provide the proper fit of the chain device to the tire and absorb the various traction loads thereon. The traction chain elements of the device of Fig. 3 are illustrated generally at 36 to comprise relatively large chain links arranged in chain formations extending diagonally from one end portion of one cross chain element to approximately the mid-portion of the next succeeding cross chain element; the diagonal disposition pattern whereof being successively reversed so that the traction chain elements are thereby arranged in alternately diagonal attitudes within the spaces between successive cross chain elements. Thus, it will be appreciated that the chain device of Fig. 3 also embodies the relatively loose traction chain element arrangement running diagonally of the tread center line, whereby the traction link elements cross the diagonal cleat devices of the tractor wheel tire, and provide improved traction and "self-cleaning" characteristics referred to hereinabove.

Figs. 4 and 5 illustrate modified forms of the arrangement of Fig. 3, wherein the taut cross chains 40 carry slack large link traction chain elements 42—44, respectively, which extend diagonally between opposite end portions of adjacent cross chain elements to provide the cleat slapping operation referred to hereinabove. In Fig. 4 the traction chain elements are disposed in zig-zag pattern, while in Fig. 5 the traction chain elements are in parallel diagonal relation.

Fig. 6 illustrates another form of the invention wherein a pair of side chains 50—50 are interconnected by cross chains 52—52 as explained hereinabove; the traction chains being illustrated at 54—54. In this case each of the traction chains 54—54 extend diagonally between the end link of one cross chain into connection with a link at the opposite end of the next adjacent cross chain element, and thus it will be appreciated that the traction chain elements 54—54 cross each other midway between the adjacent cross chain elements. However, as explained hereinabove it is a particular feature and advantage of the invention that the traction chain elements 54—54 are both so dimensioned as to be disposed in slack condition between the relatively taut cross chain elements, and the traction chain members 54—54 are not interconnected at the position of their relative crossing. Thus, the traction chain elements are free to flap about for the improved self-cleaning and traction effects referred to hereinabove.

Fig. 7 illustrates still another form of the invention wherein the side chain elements are indicated at 60—60 and the cross chain elements are indicated at 62—62. In this case the traction chain elements are indicated at 64 to comprise between each pair of adjacent cross chain elements a unit of four traction chain elements extending diagonally between the mid-portions of the cross chain element and the side chain elements therebetween; it being a particular feature of the invention that the traction chain elements 64 are arranged so as to be disposed in slack condition so as to obtain the improved self-cleaning effects referred to hereinabove.

It is a particular feature of the invention that the cross chain elements are formed of relatively small links and are lengthwise dimensioned so as to be drawn taut across the tread of the tire when mounted thereon, whereby the cross chains do not tend to roll and tighten up against the tire such as would damage the tire and reduce the cleat effect of the cross chain element. At the same time the diagonally disposed traction chain elements are arranged to be slack relative to the tire tread and are formed of large links for maximum cleat effects but are not subject to rolling tendencies because of their diagonal disposition relative to the direction of travel. Nevertheless, they have sufficient transverse force components to comprise fully effective traction elements.

Although only a few forms of the invention have been shown and described in detail it will be apparent to those skilled in the art that the invention is not so limited but that various changes may be made therein without departing from the spirit of the invention or the scope of the appended claim.

What is claimed is:

A tire chain assembly adapted to be detachably mounted about a vehicle tire circumferentially thereof and comprising a pair of side chains of a length adapting them to extend entirely about the circumference of the tire at opposite sides thereof when the chain assembly is applied to the tire in position for use, cross chains extending between said side chains and spaced from each other longitudinally thereof and at their ends being connected with links of the side chains, said cross chains being all of the same length and each of such length that it extends across the tread portion of a tire in taut condition when the chain assembly is applied to a tire of predetermined diameter, and pairs of traction chains extending diagonally in spaces between the cross chains, each traction chain consisting of interconnected links larger than the links of the cross chains, the traction chains of each pair having inner ends connected with a cross chain substantially midway the length thereof and extending therefrom in diverging relation to each other towards the side chains and having outer ends connected with opposite ends of the next cross chain, said traction chains all diverging circumferentially of the tire in the same direction and being all of such length that when the chain assembly is applied to a tire the traction chains extend loosely across the tread portion of the tire.

WILLIAM H. DEVONSHIRE.

References Cited in the file of this patent

UNITED STATES PATENTS

| Number | Name | Date |
|---|---|---|
| 1,338,772 | Hart | May 4, 1920 |
| 1,458,107 | Sincell | June 5, 1923 |
| 1,503,191 | Kittelson | July 29, 1924 |
| 1,509,877 | Richie | Sept. 30, 1924 |
| 1,537,862 | Mohr et al. | May 12, 1925 |
| 1,905,237 | Martel | Apr. 25, 1933 |
| 2,086,512 | Reyburn | July 6, 1937 |

FOREIGN PATENTS

| Number | Country | Date |
|---|---|---|
| 51,884 | Switzerland | 1910 |
| 167,006 | Switzerland | Apr. 16, 1934 |